United States Patent [19]
Werner

[11] 3,980,606
[45] Sept. 14, 1976

[54] POLYURETHANE ELASTOMERS HAVING PROLONGED FLEX LIFE AND TIRES MADE THEREFROM

[75] Inventor: Byron H. Werner, Akron, Ohio
[73] Assignee: The Firestone Tire & Rubber Company, Akron, Ohio
[22] Filed: Feb. 24, 1975
[21] Appl. No.: 552,384

[52] U.S. Cl. .................. 260/31.8 R; 152/357 A; 156/110 R; 156/110 CL; 156/128 N; 260/31.8 M; 260/77.5 AP; 260/77.5 AM; 260/858
[51] Int. Cl.² .................. C08K 5/12; C08G 18/48; C08G 18/32
[58] Field of Search .................. 152/330 R, 357 A; 260/77.5 CR, 77.5 AP, 858, 77.5 AM; 156/110 R, 110 CL, 128 U

[56] References Cited
UNITED STATES PATENTS

| | | | |
|---|---|---|---|
| 2,866,774 | 12/1958 | Price | 260/77.5 AP |
| 3,164,572 | 1/1965 | Axelrood | 260/77.5 AP |
| 3,701,374 | 10/1972 | McGillvary | 260/77.5 AM |
| 3,755,261 | 8/1973 | Van Gulick | 260/75 NH |
| 3,891,606 | 6/1975 | Kogon | 260/77.5 AM |
| R28,424 | 5/1975 | McGillvary | 260/77.5 AM |

Primary Examiner—H.S. Cockeram

[57] ABSTRACT

Polyurethane elastomers having prolonged flex life are prepared by reacting a diisocyanate with polypropylene glycol (PPG) or triol and poly(tetramethylene ether) glycol (PTEG). The diisocyanate may be reacted with each glycol separately or they may be mixed before the reaction. A smaller amount of the prepolymer obtained from the polypropylene glycol or triol is mixed with a larger amount of the prepolymer obtained from the poly(tetramethylene ether) glycol and the mixture is reacted with a hindered aromatic diamine. Elastomers cured from the resulting mixed polyurethane were found to have an exceptionally high flex life and are particularly useful in the production of products which undergo dynamic flexing, as in the preparation of pneumatic tires, particularly the sidewalls thereof, because of their exceptionally long flex life.

13 Claims, 1 Drawing Figure

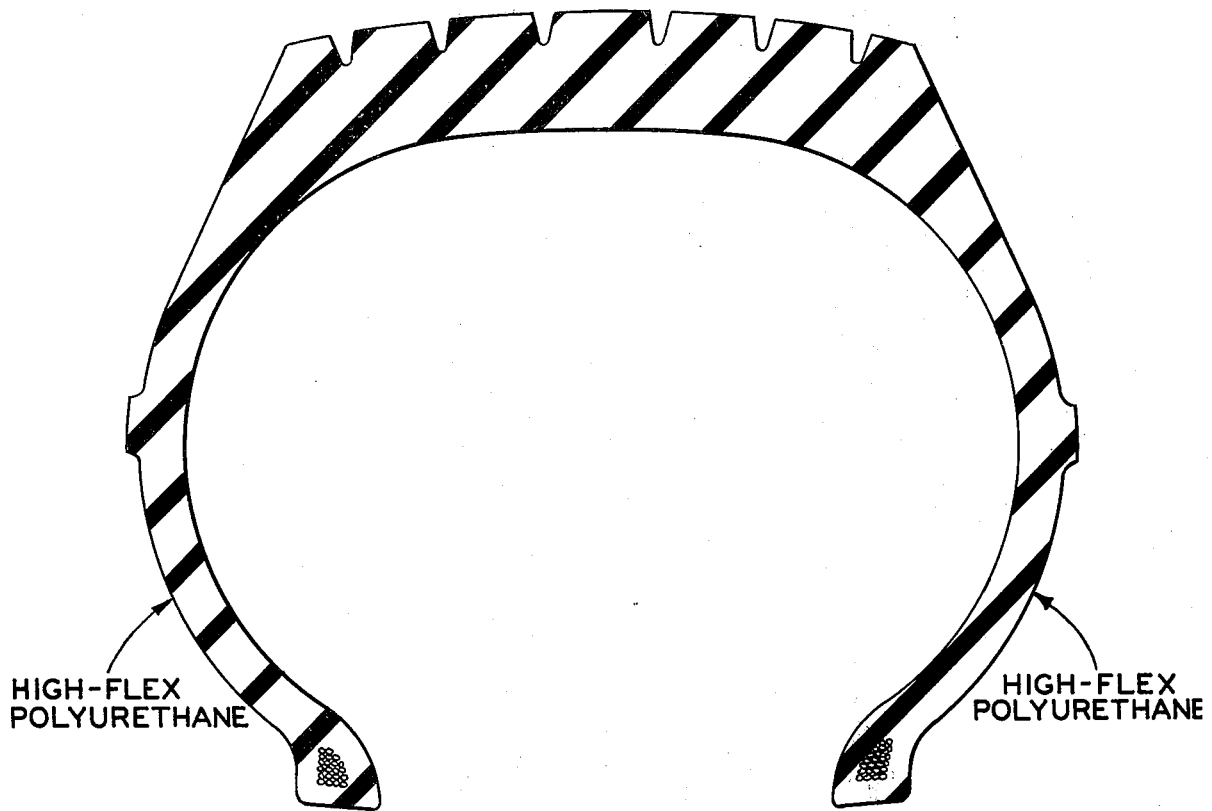

POLYURETHANE ELASTOMERS HAVING PROLONGED FLEX LIFE AND TIRES MADE THEREFROM

PRIOR ART

Polypropylene glycol has long been used for the preparation of polyurethanes for foams and products to be extruded into filaments to be used in the reinforcement of pneumatic tires.

Cast polyurethane tires have been disclosed in McGillvary U.S. Pat. No. 3,701,374 and Benzene U.S. Pat. No. 3,755,528 and U.S. Pat. No. 3,537,500.

British Pat. No. 1,210,737 describes polyurethanes for coatings and films produced from prepolymers by reacting a diisocyanate and a mixture of polyols, but the polyurethanes disclosed are thermoplastic and do not have the modulus, strength and other physical properties which are necessary for cast tire constructions.

SUMMARY OF THE INVENTION

In the casting of pneumatic tires from polyurethanes, flex fatigue of the elastomer is a very critical property of the resulting product. It has been found that flex fatigue may be greatly improved through the use of a polyurethane produced by blending two prepolymers which are produced from (A) 95 to 75 parts by weight of the reaction product of poly(tetramethylene ether) glycol (PTEG) with a molecular weight range of 600 to 1500, with a toluene diisocyanate and (B) 5 to 25 parts by weight of the reaction product of a prepolymer prepared from a polypropylene glycol (PPG) or triol with a molecular weight of 2000 to 3500 and a toluene diisocyanate.

Prepolymer A, which has a molecular weight of approximately 950 to 1850, may be a commercially available prepolymer such as Adiprene L-167, which is a poly(tetramethylene ether) glycol of molecular weight of approximately 1000 reacted with Hylene T, which is 2,4-toluene diisocyanate. Adiprene LD-784 may also be used. It is a reaction product of 1 mole of poly(tetramethylene ether) glycol and 2 moles of Hylene TM (which is 80 per cent toluene-2,4-diisocyanate and 20 per cent toluene-2,6-diisocyanate).

Prepolymer B, which has a molecular weight of approximately 2350 to 4000, may be the reaction product of 1 mole of a diol, preferably a polypropylene glycol, with 2 moles of a toluene diisocyanate or 3 moles of a toluene diisocyanate with 1 mole of a triol. It may be made from commercially available materials such as PPG 3025 (Union Carbide) which has a molecular weight of approximately 3000.

The two prepolymers are preferably a blend of prepolymer A and prepolymer B. Alternatively, the prepolymers may be made by reacting a mixture of the diols with a toluene diisocyanate. The prepolymers are cured with a hindered aromatic diamine, for example 4,4'-methylene bis(2-chloroaniline) or preferably Caytur 21 which is said to be approximately 50 per cent of tris-methylene dianiline/sodium chloride complex in dioctyl phthalate. Other hindered aromatic diamines which may be used are 3,3'-dichloro-4,4'-diaminodiphenyl methane, 2,5-dichloro phenylene diamine and o- and m-dichlorobenzidine. These are preferred because they are hindered diamines and therefore slow reactors.

Enough Caytur 21 or other diamine curative is then added to give an NH$_2$/NCO ratio of 0.95 to 1.20 and preferably 0.975 to 1.10. The resulting mixture is degassed and stirred under vacuum of 0.1 to 1.0 mm. Hg. at 45° to 50° C. for approximately 3 to 30 minutes. The resulting mixture is then poured into a mold and cured from 30 to 120 minutes at temperatures of 100° to 130° C. The same procedure may be used for the other diamine curings to which this application relates.

Although PPG 3025 (Union Carbide) with a molecular weight of about 3000 is preferred for prepolymer B, other prepolymers that may be used are trifunctional and are prepared from propylene oxide. Thanol 3002 (Jefferson Chemical Company) which is of approximately 3000 molecular weight, is an example.

Prepolymer A may be prepared from any poly(tetramethylene ether) glycol of the molecular weight range of 700 to 1500, such as the Polymegs sold by Quaker Oats Company.

Although Caytur 21 is a preferred aromatic hindered diamine, other such diamines which may be used as a curing agent include 4,4'-methylene (bis)-2-chloroaniline (MOCA).

The invention is illustrated by the drawing and by the following examples:

EXAMPLE I 2441.0 grams (0.84 mole) of polypropylene glycol (PPG 3025) having a hydroxyl number of 38.6 and 295.0 grams of Hylene TM (1.68 mole) were used. The polypropylene glycol was first degassed and dehydrated by heating to 80°–90° C. under vacuum after which the Hylene TM was added with stirring. The mixture was stirred 10 hours under nitrogen at 75°–80° C. The resulting prepolymer B was then degassed under vacuum. It was found to have an NCO content of 2.51%.

This prepolymer B was then blended with Adiprene LD 784, prepolymer A, in the different amounts noted in the table, the examples were cured with Caytur 21 using an NH$_2$/NCO equivalent ratio of 1.025 for two hours at 120° C. and upon evaluation the following properties were obtained:

| Prepolymer B parts by weight | 0 | 5 | 10 | 20 |
|---|---|---|---|---|
| Prepolymer A parts by weight | 100 | 95 | 90 | 80 |
| Shore A Hardness, R. Temp. | 95 | 96 | 96 | 94 |
| Room Temperature Properties: | | | | |
| Tensile, psi | 4160 | 4325 | 4175 | 3225 |
| Elongation, % | 535 | 555 | 580 | 630 |
| Modulus: 5% | 474 | 436 | 480 | 422 |
| 100% | 1125 | 1200 | 1100 | 900 |
| 300% | 1775 | 1775 | 1675 | 1350 |
| 500% | 3600 | 3525 | 3025 | 2125 |
| Crescent Tear, lb./lin. in. | 430 | 490 | 442 | 368 |
| Properties at 212° F. | | | | |
| Tensile, psi | 2490 | 2330 | 2163 | 1690 |
| Elongation, % | 590 | 630 | 673 | 660 |
| Modulus: 100% | 953 | 910 | 850 | 747 |
| 300% | 1377 | 1297 | 1217 | 1040 |
| Crescent Tear, lb./lin. in. | 308 | 349 | 321 | 205 |
| TexUS Flex*(Ave.) | 10,000 | 14,500 | 27,500 | 46,000 |

*TexUS Flex Machine Tester, Model No. 31-11, Testing Machines, Inc., Amityville, N.Y., was used in this test.

The results show that considerable increase in flex fatique has been obtained through the use of 5 to 20% of the polypropylene glycol prepolymer. The properties (other than flex properties) of the elastomers produced from compositions containing more than 25% of the polypropylene glycol dropped off rapidly, making them undesirable for production of tire sidewalls because higher levels result in tire growth and lower tire strength because of reduced modulus and tensile figures.

75°–80° C. under nitrogen for 16 hours. The resulting prepolymer B was then degassed under vacuum of 0.5–1 mm. Hg. for 45 minutes and was found to have an NCO content of 3.62%.

This prepolymer B was then blended with Adiprene LD 784 (Prepolymer A) in varying amounts as noted in the following table. The samples were cured with Caytur 21 using enough Caytur to give a desired NH$_2$/NCO ratio. Upon evaluation the following properties were obtained:

|  | Sample 1 | Sample 2 | Sample 3 |
| --- | --- | --- | --- |
| Prepolymer B, parts | 0 | 10 | 20 |
| Prepolymer A, parts | 100 | 90 | 80 |
| NH$_2$/NCO | 1.025 | 1.10 | 1.10 |
| Shore A Hardness, R.T. | 95 | 93 | 91 |
| Room Temperature Properties: |  |  |  |
| Tensile, psi | 4750 | 4275 | 3655 |
| Elongation, % | 505 | 620 | 620 |
| Modulus: 5% | 475 | 459 | 419 |
| 100% | 1260 | 1000 | 850 |
| 300% | 2050 | 1525 | 1375 |
| 500% | 4450 | 2625 | 2300 |
| Crescent Tear, lb./lin. in. | 473 | 393 | 331 |
| Properties at 212° F. |  |  |  |
| Tensile, psi | 2053 | 2110 | 2167 |
| Elongation, % | 503 | 623 | 607 |
| Modulus: 100% | 915 | 780 | 690 |
| 300% | 1373 | 1167 | 1167 |
| Crescent Tear, lb./lin. in. | 280 | 265 | 218 |
| R.T. TexUS Flex, Ave. | 14,250 | 43,000 | 278,000 |

EXAMPLE II

This example illustrates the use of a trifunctional polypropylene polyol prepolymer.

1908 grams of Thanol 3002 (0.65 moles), a trifunctional polypropylene polyol, hydroxyl No. 57, molecular weight approximately 2953, (Jefferson Chemical Co.) was used here in the preparation of the desired prepolymer B with 340 grams (1.95 moles) of Hylene TM. The Thanol was first degassed and dehydrated by heating to 80°–90° C. under vacuum of 0.5 mm. Hg. for 1 hour after which the Hylene TM was added with stirring under nitrogen. The mixture was then stirred at The shown improvement in flex life which results from the addition of the Thanol 3002 - TDI prepolymer is obvious. Again, a trend toward improved flex fatigue with increasing amounts of the Thanol prepolymer was observed.

EXAMPLE III

The properties of MOCA cures of blends of different parts by weight of the above-described Thanol 3002-diisocyanate prepolymer per 100 parts of the prepolymer from polytetramethylene ether glycol-2,4-toluene diisocyanate, cured with 4,4'-methylene-bis(2-chloroaniline) are illustrated in the following table:

| Pt. Thanol Prep/100 pt. L-167 | 5 | 10 | 15 | 20 |
| --- | --- | --- | --- | --- |
| Pt. Dioctyl Phthalate | 20 | 20 | 20 | 20 |
| NH$_2$/NCO | 1.05 | 1.05 | 1.05 | 1.05 |
| Shore A | 91 | 92 | 90 | 90 |
| R.T. Tensile, psi | 3160 | 3325 | 3200 | 3375 |
| Elongation, % | 545 | 600 | 575 | 555 |
| Modulus: 5% | 363 | 410 | 355 | 324 |
| 100% | 1200 | 1000 | 1000 | 975 |
| 300% | 1600 | 1450 | 1475 | 1500 |
| 500% | 2685 | 2250 | 2325 | 2450 |
| 212°F. Tensile, psi | 2087 | 2033 | 1660 | 1900 |
| Elongation, % | 617 | 697 | 490 | 560 |
| Modulus: 100% | 833 | 652 | 750 | 683 |
| 300% | 1133 | 930 | 1070 | 1042 |
| Crescent Tear: R.T. | 428 | 400 | 400 | 387 |
| 212° F. | 327 | 277 | 234 | 241 |
| YMI, °C. | −15 | −14 | −15 | −15 |
| % Rebound: R.T. | — | 50 | 36 | 50 |

| | | | | |
|---|---|---|---|---|
| 212° F. | — | 69 | 65 | 70 |
| TexUS Flex Ave. | 22,680 | 91,430 | 313,200 | 181,680 |

Other plasticizers than dioctyl phthalate may be used in this formulation or may be added to any of the other formulations in amounts varying from 10 to 25 parts per 100 parts of the polyurethane formed, or other plasticizers may be used such as polyethylene glycol dioctoate, dioctyl adipate, dioctyl azelate, or tricresyl phosphate or other polyurethane plasticizers known to the art.

Tires which utilize polyurethane elastomers of this invention are composed essentially of polyurethanes as disclosed but may contain plasticizers, coloring pigments, stabilizers, etc.

In producing tires from compositions disclosed herein, the mixture of prepolymer and amine are molded or otherwise shaped to form a tire sidewall or portion of a tire or other product and allowed to cure at elevated temperature. The casting of tires from polyurethanes is old in the art and the known procedures or other procedures may be used in carrying out the invention.

The foregoing results are illustrative of pneumatic tires to which the invention is applicable including even runflat tires (such as disclosed in Tangorra U.S. Pat. No. 3,840,060), tires reinforced with cords, belts, etc. of any composition, and tires only the sidewalls or sidewalls and bead-portions of which are composed of polyurethane, whether cast or otherwise formed.

EXAMPLE IV

A tire was cast from the following polyurethane composition by a procedure not essentially different from the general procedures of the foregoing Benzene and McGillvary patents.

| | |
|---|---|
| 80.0 pt. | Polytetramethylene ether glycol-toluene diisocyanate prepolymer, 1300 molecular weight. |
| 20.0 pt. | Polypropylene glycol - toluene diisocyanate prepolymer, 3000 molecular weight. |
| 30.7 pt. | 50% dispersion of methylene dianiline/sodium chloride complex in dioctyl phthalate. |
| 4.8 pt. | Dioctyl phthalate. |

The mixture was degassed under vacuum of approximately 0.7 mm. Hg. and warmed to 50° C. for approximately thirty minutes. It was then pressured into the mold for a passenger tire and cured 1 hour at 120° C.

The resulting tire was tested on an indoor drum according to the durability test of the Motor Vehicle Standard No. 109 (MVSS-109) as described by the National Highway Traffic Safety Administration.

After running in the test under the specified load conditions for 44 hours at 50 miles per hour, the tire was inspected and showed no evidence of cracking or breaking. The test was therefore continued for an additional 24 hours before cracking was observed. Thus, it was determined that the above tire far exceeded the minimum test requirements (34 hours) and the composition used is superior for tire sidewalls.

I claim:

1. A pneumatic tire the sidewalls of which are composed essentially of a cured mixture of (A) 95 to 75 parts by weight of a polyurethane prepolymer with a molecular weight of 950 to 1850, which is the reaction product of substantially one mole of poly(tetramethylene ether) glycol and substantially 2 moles of a toluene diisocyanate and (B) 5 to 25 parts by weight of a prepolymer which is the reaction product of substantially 1 mole of polypropylene glycol or triol and substantially 2 or 3 moles, respectively, of a toluene diisocyanate, which prepolymer B has a molecular weight of 2350 to 4000, said mixtures being cured by a hindered aromatic diamine and producing a polyurethane in which the $NH_2$/NCO ratio is 0.95–1.20.

2. The tire of claim 1 in which prepolymer A is essentially the reaction product of 1 mole of polytetramethylene ether glycol having a molecular weight of 600 to 1500 and substantially 2 moles of 80/20 2,4/2,6-toluene diisocyanate.

3. The tire of claim 1 in which prepolymer A is essentially the reaction product of 1 mole of polytetramethylene ether glycol having a molecular weight of 600 to 1500 and substantially 2 moles of 2,4-toluene diisocyanate.

4. The tire of claim 1 in which prepolymer B is essentially the reaction product of 1 mole of polypropylene glycol of molecular weight of substantially 3000 and 2 moles of a toluene/diisocyanate.

5. The tire of claim 1 in which prepolymer B is essentially the reaction product of 1 mole of polypropylene triol of molecular weight of substantially 3000 and 3 moles of a toluene diisocyanate.

6. The tire of claim 1 in which the diamine is tris-methylene dianiline/sodium chloride complex.

7. The tire of claim 1 in which the diamine is 4,4'-methylene-bis(2-chloroaniline).

8. The tire of claim 1 in which the polyurethane is plasticized with substantially 10 to 25 parts of polyurethane plasticizer per 100 parts of the polyurethane.

9. The tire of claim 1 in which the plasticizer is dioctyl phthalate.

10. The method of producing a polyurethane of high flexibility which comprises forming a first prepolymer from 1 mole of poly(tetramethylene ether) glycol and substantially 2 moles of a toluene diisocyanate, forming a second prepolymer from 1 mole of polypropylene glycol or triol and substantially 2 or 3 moles, respectively, of a toluene diisocyanate, and curing 5 to 25 parts of the second prepolymer and 95 to 75 parts of the first prepolymer with a hindered aromatic diamine.

11. The process of claim 10 in which the prepolymers are formed separately and then blended before curing.

12. The process of claim 10 in which the cure is effected with tris-methylene dianiline/sodium chloride complex.

13. The process of claim 10 in which the cure is effected with 4,4'-methylene-bis(2-chloroaniline).

\* \* \* \* \*